(12) United States Patent
Craig et al.

(10) Patent No.: US 9,694,853 B2
(45) Date of Patent: Jul. 4, 2017

(54) UNDERBODY MOUNTED RIM ENGAGEMENT MEMBER

(71) Applicant: Ford Global Technologies, LLC, Dearborn, MI (US)

(72) Inventors: Ryan Craig, Harrison Township, MI (US); Akshay Kulkarni, Farmington Hills, MI (US); Chris Stephen O'Connor, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/952,460

(22) Filed: Nov. 25, 2015

(65) Prior Publication Data

US 2017/0144707 A1    May 25, 2017

(51) Int. Cl.
*B60R 19/00* (2006.01)
*B62D 21/15* (2006.01)

(52) U.S. Cl.
CPC .................................. *B62D 21/155* (2013.01)

(58) Field of Classification Search
CPC .............. B62D 21/155; B62D 25/2036; B60R 2019/002; B60R 19/00
USPC ..................................... 296/204, 187.1, 198
See application file for complete search history.

(56) References Cited

U.S. PATENT DOCUMENTS

| 5,275,436 | A | * | 1/1994 | Pomero | B60R 21/00 180/232 |
|---|---|---|---|---|---|
| 6,364,358 | B1 | | 4/2002 | Miller | |
| 6,460,889 | B2 | * | 10/2002 | Iyanagi | B62D 21/152 280/784 |
| 6,854,553 | B2 | | 2/2005 | Sovoda et al. | |
| 6,866,115 | B2 | * | 3/2005 | Miyasaka | B60R 19/00 180/311 |
| 7,163,259 | B2 | | 1/2007 | Hayashi | |
| 8,613,461 | B2 | | 12/2013 | Young et al. | |
| 8,646,790 | B2 | | 2/2014 | Young et al. | |
| 8,985,258 | B1 | * | 3/2015 | Midoun | B62D 25/082 180/274 |
| 2009/0146462 | A1 | * | 6/2009 | Sato | B62D 21/157 296/203.03 |
| 2014/0232136 | A1 | * | 8/2014 | Gilbert | B62D 24/00 296/187.09 |
| 2015/0048650 | A1 | | 2/2015 | Gupta et al. | |
| 2015/0084322 | A1 | | 3/2015 | Killian et al. | |
| 2015/0130217 | A1 | | 5/2015 | Shaner et al. | |

* cited by examiner

*Primary Examiner* — Jason S Morrow
*Assistant Examiner* — E Turner Hicks
(74) *Attorney, Agent, or Firm* — Frank MacKenzie; Bejin Bieneman PLC

(57) ABSTRACT

A vehicle includes a vehicle body that includes a rocker fixed to an underbody. The rocker and the under body at least in part define a front wheel well of the vehicle. A rim engagement member is cantilevered from the underbody and extends into the wheel well. The rim engagement member snags a rim of a front wheel of the vehicle and directs movement of a front wheel of the vehicle away from intrusion into a floor and/or dash of the vehicle.

17 Claims, 5 Drawing Sheets

UNDERBODY MOUNTED RIM ENGAGEMENT MEMBER

BACKGROUND

During an offset frontal impact of a vehicle, the direction the impact is offset from major structural components of the vehicle. Offset front impacts can be simulated with a small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

During the front impact, the wheel may be oriented with a front portion of the wheel being positioned outboard relative to a rear portion of the wheel. In this position, the wheel may be trapped between a bumper beam of the vehicle and a rear of a wheel well of the vehicle. As the bumper beam moves toward the rear of the wheel well, the bumper and/or other components of the vehicle may force the wheel to intrude into a passenger compartment of the vehicle, e.g., through a floor or dash of the vehicle. Intrusion of the wheel into the floor or dash of the vehicle is a metric recorded in the IIHS SORB frontal crash test. There remains an opportunity to design components of the vehicle to prevent the wheel from intruding into the passenger compartment during an offset front impact.

DETAILED DESCRIPTION

Figure 1:
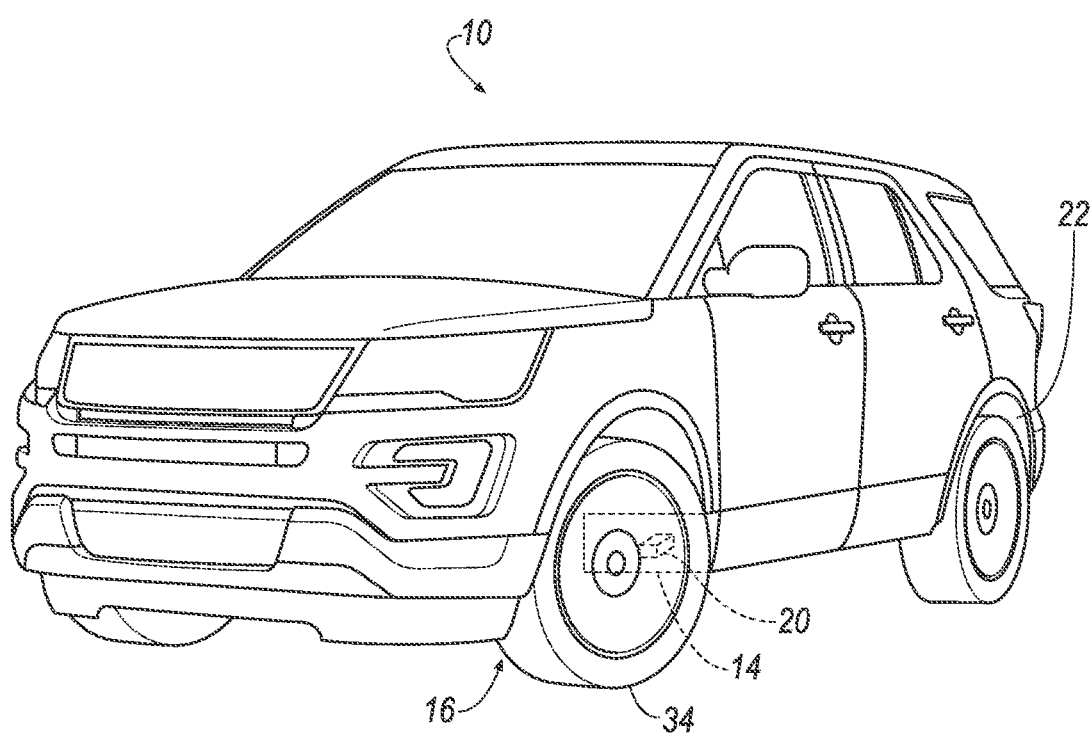
FIG. 1 is a perspective view of a vehicle with a rim engagement member shown in broken lines in a wheel well of the vehicle.

With reference to the Figures, wherein like numerals indicate like parts throughout the several views, a vehicle 10 includes a rocker 12 and an underbody 14 fixed to the rocker 12. The rocker 12 and the underbody 14 at least in part define a wheel well 16. A rim 18 is disposed in the wheel well 16. A rim engagement member 20 is cantilevered from the underbody 14 and extends into the wheel well 16.

During a front impact of the vehicle 10, the rim 18 may be forced rearward toward the underbody 14. The rim 18 may engage the rim engagement member 20 during movement of the rim 18 toward the underbody 14. In this situation, the rim 18 catches on the rim engagement member 20, and the rim engagement member 20 may to guide the movement of the rim 18 to limit or prevent intrusion of the rim 18 into a floor, dash, and/or passenger compartment of the vehicle 10. The rim engagement member may absorb at least part of the force generated from the front impact. Specifically, when the rim 18 engages the rim engagement member 20, the rim engagement member 20 may absorb force from the rim 18 and may transfer force to other vehicle 10 components, e.g., the underbody 14, the rocker 12, etc.

Figure 2:
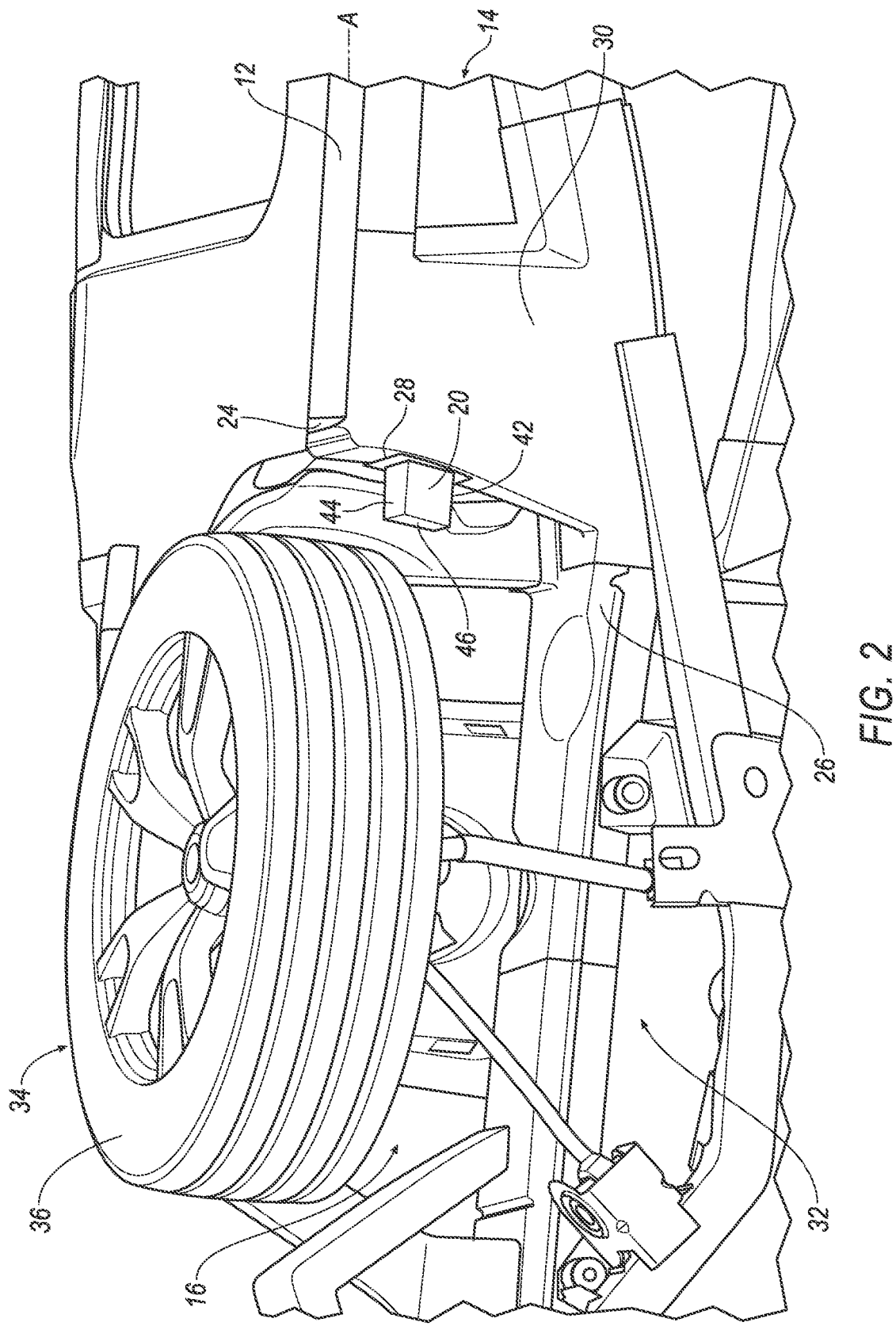
FIG. 2 is a perspective view of a bottom of the vehicle with the rim engagement member cantilevered from an underbody of the vehicle.

As shown in FIG. 2, a body 32 of the vehicle may include the rocker 12 and the underbody 14. The body 32, for example, may be a unibody construction, i.e., a unitary body construction, as opposed to a body-on-frame construction. The unibody construction includes a unitary body. The body-on-frame construction includes a separate frame, including longitudinal rails, to which separate body is fixed. In other words, the rocker 12 and the underbody 14 are formed as a unitary body.

The rocker 12 may extend along a longitudinal axis A. The wheel well 16 may be a front wheel well, and the rocker 12 may extend from the wheel well 16 to the rear wheel well 22. The rocker 12 may include an end 24 that faces the wheel well 16 and that at least in part defines the wheel well 16. The rocker 12 may be formed of any suitable material, e.g., aluminum, steel, etc. The vehicle 10 may include a pair of rockers 12, with one of the rockers 12 disposed on a left side of the vehicle 10 and one of the rockers 12 disposed on a right side of the vehicle 10.

The vehicle body 32 may include a body member 26 that is spaced from the rocker 12 and that extends along the wheel well 16. The body member 26 is a component of the unibody construction set forth above. The body member 26, for example, may be a beam of the front end of the vehicle body 32, as shown in FIGS. 2-5. The rocker 12 may be disposed inboard of the wheel well 16. The body member 26 may be spaced from the rocker 12 and the underbody 14 may extend from the rocker 12 to the body member 26. The body member 26 may be formed of any suitable material, e.g., aluminum, steel, etc.

With continued reference to FIG. 2, the underbody 14 may extend from the rocker 12 in a direction transverse to the longitudinal axis A. The underbody 14 may extend from one of the rockers 12 to the other of the rockers 12.

The underbody 14 may include a surface 28 that faces the wheel well 16 and at least in part defines the wheel well 16. The surface 28 may be slanted in a vehicle 10 rearward direction from the body member 26 to the rocker 12. The surface 28 supports the rim engagement member 20. As described above and as shown in FIGS. 3-5, the underbody 14 may absorb force from the rim 18 during the front impact. For example, the rim engagement member 20 may transfer force from the rim 18 to the underbody 14. The underbody 14 may deform to absorb force from the rim 18. The underbody 14 may be configured to be deformed by the rim 18 or other components of the vehicle 10 during the front impact. For example, the material type and/or shape of the underbody 14 may be designed to encourage such deformation. The underbody 14 may be formed of any suitable material, e.g., steel, aluminum, etc.

The underbody 14 may include a torque box 30 presenting the surface 28, i.e., the rim engagement member 20 may be fixed to the surface 28 of the torque box 28. The torque box 30 may be disposed between the body member 26 and the rocker 12. The torque box 30 may abut the rocker 12 and may extend in a direction transverse to the longitudinal axis A. In this manner, the torque box 30 may connect the body member 26 to the rocker 12. The torque box 30 may at least in part define the wheel well 16.

The torque box 30 may reinforce the body 32 against forces generated by vehicle 10 operation, such as twisting forces generated by vehicle 10 during operation, and transfer the force to the vehicle body 32, e.g., the underbody 14, the body member 26, the rocker 12, etc. The torque box 30 may support the rim engagement member 20 and may receive the force from the front impact transferred from the rim engagement member 20. The torque box 30 may transfer the force to other vehicle 10 components, e.g., the rest of the underbody 14, the rocker 12, etc.

A wheel 34 of the vehicle 10 is disposed in the wheel well 16 and may include the rim 18 and a tire 36 mounted to the rim 18. The wheel 34 may be spaced from the underbody 14, the rim engagement member 20, and the body member 26. The rim 18 may be formed of any suitable material, e.g., steel, aluminum, etc.

The rim 18 may include a pair of flanges 38 spaced from each other. Specifically, the rim 18 may include a middle portion 40 extending between the flanges 38. The flanges 38 and the middle portion 40 each extend circumferentially about the rim 18.

The rim engagement member 20 may be disposed on the underbody 14 between the body member 26 and the rocker 12. Specifically, as shown in the figures, the rim engagement member 20 may be disposed on the torque box 30 between the body member 26 and the rocker 12. The rim engagement member 20 is spaced from the rocker 12, i.e., is spaced inboard from the rocker 12. The rim engagement member 20 may also be spaced from the body member 26.

The rim engagement member 20 may extend from the underbody 14 in a direction along the longitudinal axis A and toward the rim 18, i.e., spaced from and in parallel with the longitudinal axis A. The rim engagement member 20 may include an inboard side 42 and an outboard side 44, each of which extends from the underbody 14 toward the rim 18. Each of the inboard side 42 and the outboard side 44 may be of any suitable length. Specifically, as shown in FIGS. 2-3 the inboard side 42 and the outboard side 44 may be different lengths such that the rim engagement member 20 tapers, as described further below.

The rim engagement member 20 may include an end 46 that is opposite, e.g., that faces away from, the underbody 14 and spaced from the rim 18. The end 46 may be shaped to engage the rim 18 as the rim 18 moves toward the rim engagement member 20. Specifically, the end 46 may slant toward the rocker 12 and/or the body member 26, i.e., the end 46 may taper from the inboard side 42 to the outboard side 44. As shown in FIG. 3, the tapered position of the end 46 of the rim engagement member 20 may align with the middle portion 40 when the rim 18 moves toward the rim engagement member 20.

Figure 3:
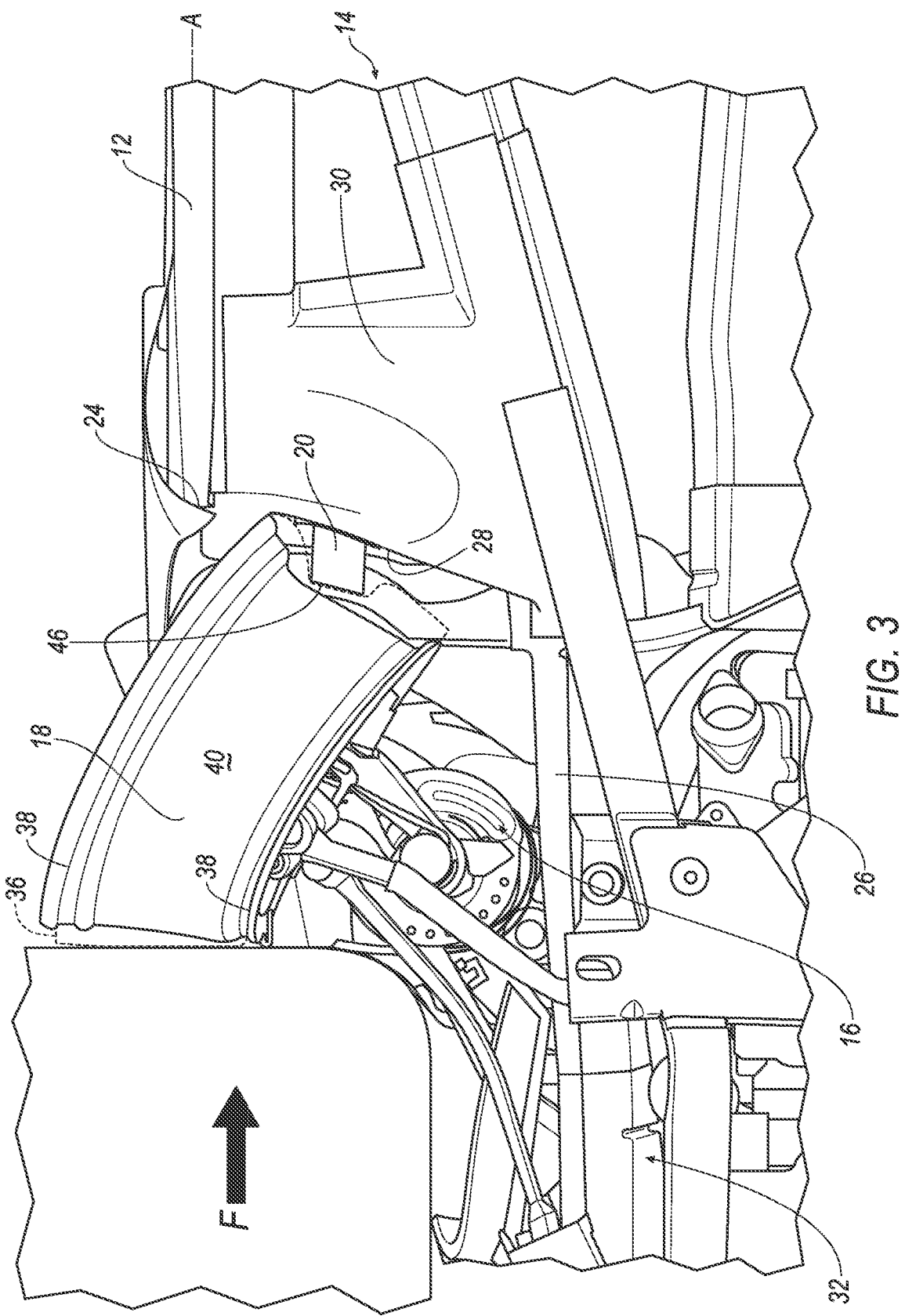
FIG. 3 is a perspective view of the rim engagement member as a rim of the vehicle initially impacts the rim engagement member during a front impact of the vehicle.
Figure 4:
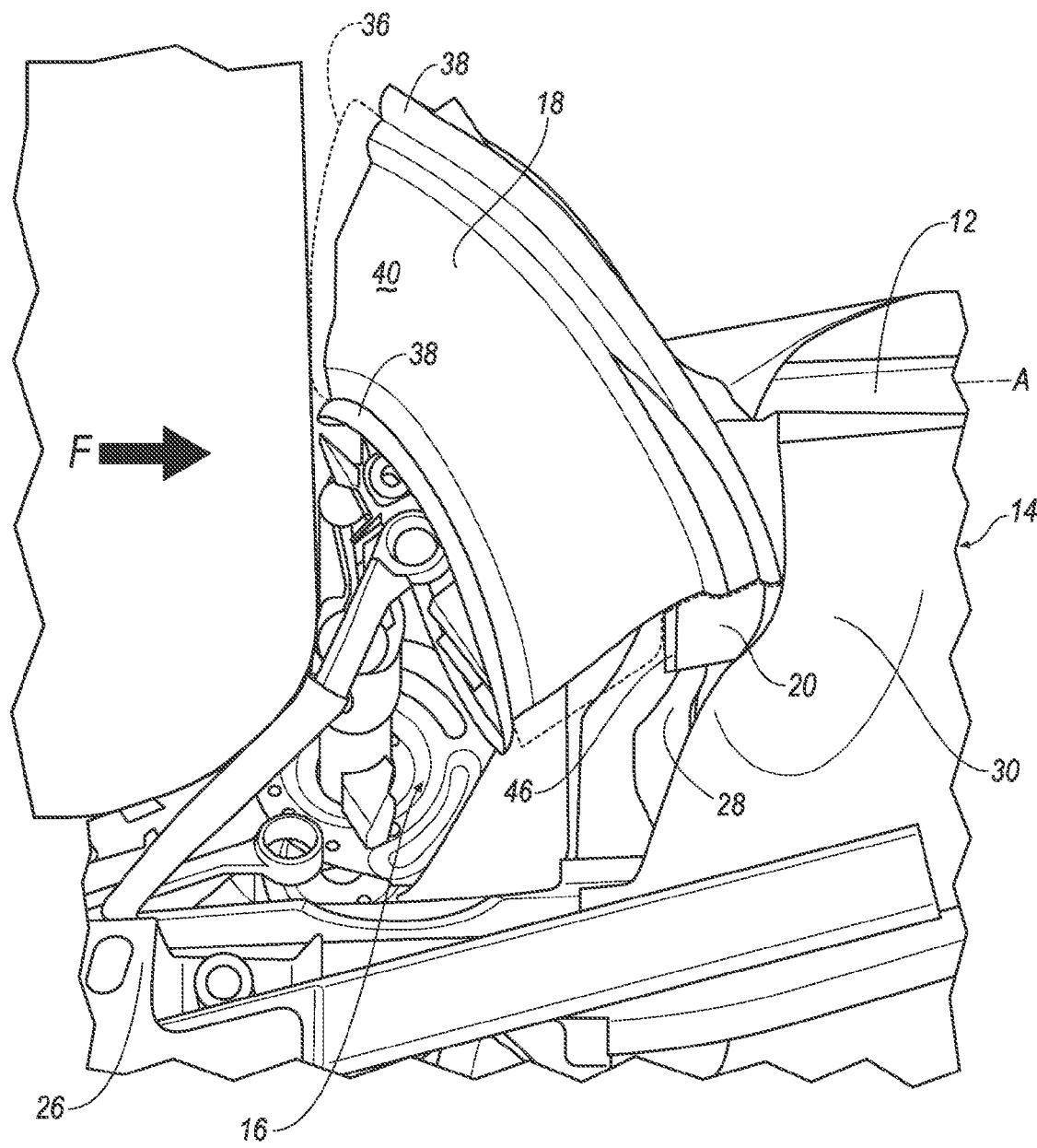
FIG. 4 is the perspective view of FIG. 3 as the rim continues to move toward the underbody during the front impact.
Figure 5:
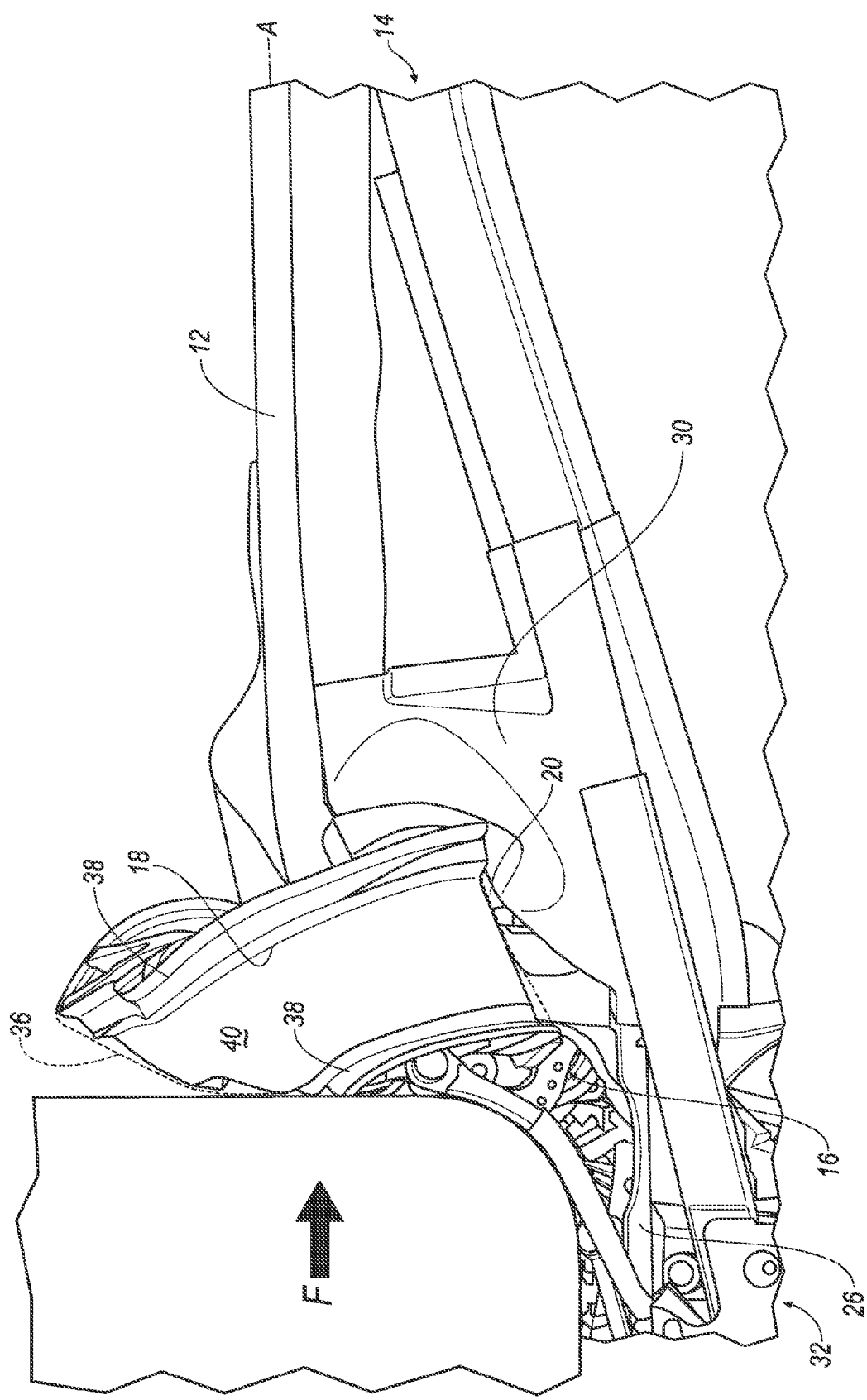
FIG. 5 is the perspective view of FIG. 4 as the rim continues to move toward the underbody during the front impact.

As shown in FIGS. 3-5, the rim engagement member 20 may be rigid relative to the rim 18, i.e., the rim 18 may be flexible relative to the rim engagement member 20. In other words, the rim 18 may deform relative to the rim engagement member 20 when the rim 18 contacts the rim engagement member 20 during a front impact. As such, the rim engagement member 20 may snag the rim 18 during the front impact and direct movement of the rim 18, as shown in FIGS. 3-5.

The rim engagement member 20 may be mounted to the underbody 14 any suitable manner, e.g., fastening, welding, etc. Specifically, the rim engagement member 20 may be fixed to the underbody 14, i.e., may move with the underbody 14 during frontal impact, as shown in FIGS. 3-5. The rim engagement member 20 may deform the underbody 14 during the frontal impact as the rim 18 is forced into the rim engagement member 20.

The rim engagement member 20 may be formed of any suitable material. For example, the rim engagement member 20 may be formed of metal, e.g., boron steel, steel, etc. As another example, the rim engagement member 20 may be formed of a polymeric material, e.g., nylon, nylon composite, etc.

As shown in FIGS. 3-5, the rim engagement member 20 may be configured to, e.g., positioned along the underbody 14, sized, and shaped to, engage the rim 18 between the flanges 38. As shown in FIGS. 2-5, the wheel 34 moves toward the underbody 14 along an arced path during the front impact, and contacts the rim engagement member 20 along the arced path.

With reference to FIG. 2, the wheel 34 is spaced from the rim engagement member 20 during typical operation of the vehicle 10. As shown in FIG. 3, as the wheel 34 moves along the arced path, the middle portion 40 of the rim 18 is aligned with the rim engagement member 20 during the front impact. In other words, the rim 18 is aligned with the rim engagement member 20 between the flanges 38.

As shown in FIG. 4, as the wheel 34 continues to move in a vehicle 10-rearward direction during the front impact, the rim engagement member 20 snags the rim 18 to direct movement of the rim 18 away from intrusion into the floor and dash of the vehicle 10. Specifically, as the wheel 34 moves along the arced motion, the middle portion 40 of the rim 18 may first engage the rim engagement member 20. As the wheel 34 continues to move, the middle portion 40 slides along the rim engagement member 20, and the rim engagement member 20 engages, i.e., snags the flange 38 of the rim 18. When the middle portion 40 and the flange 38 engage the rim engagement member 20, the rim engagement member 20 may remain stationary relative to the rim 18 and the underbody 14, and the movement of the rim 18 is guided by the rim engagement member 20.

As shown in FIG. 5, as the front impact continues, the rim engagement member 20 continues to guide the rim 18 and transfers force from the rim 18 to the underbody 14. The underbody 14 may deform to absorb energy from the rim 18 and/or to guide the rim 18 away from intrusion into the floor and dash.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle body comprising:
   a rocker elongated along a longitudinal axis;
   a body member spaced from the rocker and extending along a wheel well;
   an underbody extending along the wheel well transverse to the longitudinal axis from the rocker to the body member; and
   a rim engagement member cantilevered from the underbody between the body member and the rocker and extending parallel to the longitudinal axis from the underbody into the wheel well.

2. The vehicle body as set forth in claim 1, wherein the rim engagement member is spaced from the rocker.

3. The vehicle body as set forth in claim 1, wherein the rim engagement member includes an end opposite the underbody, the end slanting toward at least one of the rocker and the body member.

4. The vehicle body as set forth in claim 1, wherein the rim engagement member includes an inboard side, an outboard side, and an end tapering from the inboard side to the outboard side.

5. The vehicle body as set forth in claim 1, wherein the underbody includes a torque box, and wherein the rim engagement member is fixed to the torque box.

6. The vehicle body as set forth in claim 1, wherein the rim engagement member is bolted to the underbody.

7. The vehicle body as set forth in claim 1, wherein the rocker and the underbody have a unibody structure.

8. A vehicle comprising:
a rocker elongated along a longitudinal axis;
an underbody extending from the rocker in direction transverse to the longitudinal axis and at least in part defining a wheel well;
a rim disposed in the wheel well; and
a rim engagement member cantilevered from the underbody and extending from the underbody in parallel with the longitudinal axis into the wheel well.

9. The vehicle as set forth in claim 8, wherein the rim engagement member extends from the underbody toward the rim and is spaced from the rim.

10. The vehicle as set forth in claim 8, further comprising a body member spaced from the rocker and extending along the wheel well, the underbody extending from the rocker to the body member, wherein the rim engagement member extends from the underbody between the rocker and the body member.

11. The vehicle as set forth in claim 8, wherein the rim includes a pair of flanges spaced from each other, and wherein the rim engagement member is configured to engage the rim between the flanges.

12. The vehicle as set forth in claim 8, wherein the rim engagement member includes an inboard side, an outboard side, and an end tapering from the inboard side to the outboard side.

13. The vehicle as set forth in claim 8, wherein the underbody includes a torque box, and wherein the rim engagement member is fixed to the torque box.

14. The vehicle as set forth in claim 8, wherein the rim engagement member is bolted to the underbody.

15. The vehicle as set forth in claim 8, wherein the rocker and the underbody have a unibody structure.

16. The vehicle body as set forth in claim 1, wherein the underbody has a surface extending in a cross-vehicle direction between the rocker and the body member, and wherein the rim engagement member extends from the surface in a vehicle-forward direction.

17. The vehicle as set forth in claim 8, wherein the underbody has a surface extending in a cross-vehicle direction, and wherein the rim engagement member extends from the surface in a vehicle-forward direction.

* * * * *